United States Patent
Schaefer et al.

(10) Patent No.: US 12,469,184 B2
(45) Date of Patent: Nov. 11, 2025

(54) SYSTEM AND METHOD FOR UNSTRUCTURED LANE ESTIMATION

(71) Applicant: Woven Alpha, Inc., Tokyo (JP)

(72) Inventors: Alexander C. Schaefer, Fremont, CA (US); Jose Felix Ladeia Rodrigues, Sunnyvale, CA (US); Shunsho Kaku, Mountain View, CA (US)

(73) Assignee: Woven by Toyota, Inc., Tokyo (JP)

( * ) Notice: Subject to any disclaimer, the term of this patent is extended or adjusted under 35 U.S.C. 154(b) by 230 days.

(21) Appl. No.: 18/199,008

(22) Filed: May 18, 2023

(65) Prior Publication Data

US 2024/0386619 A1  Nov. 21, 2024

(51) Int. Cl.
| | |
|---|---|
| *G06V 20/56* | (2022.01) |
| *G01C 21/00* | (2006.01) |
| *G01C 21/36* | (2006.01) |
| *G06T 7/13* | (2017.01) |
| *G06T 11/00* | (2006.01) |
| *G06V 10/44* | (2022.01) |

(52) U.S. Cl.
CPC .......... *G06T 11/00* (2013.01); *G01C 21/3635* (2013.01); *G01C 21/3841* (2020.08); *G06T 7/13* (2017.01); *G06V 20/588* (2022.01); *B60W 2420/403* (2013.01); *G06T 2207/20076* (2013.01); *G06T 2207/20084* (2013.01); *G06T 2207/30241* (2013.01); *G06T 2207/30256* (2013.01); *G06V 10/457* (2022.01)

(58) Field of Classification Search
None
See application file for complete search history.

(56) References Cited

U.S. PATENT DOCUMENTS

| | | | |
|---|---|---|---|
| 2014/0172366 A1* | 6/2014 | Hannebutte | G06F 18/251 |
| | | | 702/181 |
| 2018/0189578 A1 | 7/2018 | Yang et al. | |
| 2019/0130182 A1* | 5/2019 | Zang | G06V 20/182 |
| 2019/0147331 A1 | 5/2019 | Arditi | |
| 2020/0098135 A1* | 3/2020 | Ganjineh | G01C 21/3811 |
| 2021/0199461 A1 | 7/2021 | Raina et al. | |
| 2023/0215190 A1* | 7/2023 | Rezaei | G06V 10/82 |
| | | | 382/181 |

FOREIGN PATENT DOCUMENTS

KR  102296596 B1  9/2021

\* cited by examiner

*Primary Examiner* — Joni Hsu
(74) *Attorney, Agent, or Firm* — Christopher G. Darrow; Darrow Mustafa PC (57) ABSTRACT

Systems and methods are disclosed herein for performing unstructured lane estimation. In one example, unstructured lane estimation involves the steps of receiving an overhead representation of a region and a rasterized trace generated from sensors of a vehicle traveling in the region and outputting, using a machine learning model, probabilities that neighboring pixels of pixels forming the rasterized trace is part of a lane based on the overhead representation and the rasterized trace.

20 Claims, 7 Drawing Sheets

SYSTEM AND METHOD FOR UNSTRUCTURED LANE ESTIMATION

TECHNICAL FIELD

The subject matter described herein relates, in general, to systems and methods for unstructured lane estimation and, more specifically, for unstructured lane estimation utilizing trace data collected from one or more vehicles.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Electronic maps, such as high-definition (HD) maps, are highly accurate maps used in autonomous driving. In some cases, HD maps include details not normally present in traditional maps. In some cases, HD maps can be precise to the centimeter level and include road details such as the number of lanes, lane markings, road signs, etc. However, HD maps are generally laborious to produce. Further compounding this difficulty, there can be difficulty in involving the estimating of drivable areas within unstructured areas where no explicit lane structure is available. For example, estimating drivable areas within parking lots or other unstructured areas is notoriously difficult.

SUMMARY

This section generally summarizes the disclosure and is not a comprehensive explanation of its full scope or all its features.

In one embodiment, a system includes a processor and a memory that communicates with the processor. The memory includes instructions that, when executed by the processor, cause the processor to receive an overhead representation of a region and a rasterized trace generated from sensors of a vehicle traveling in the region. The instructions then cause the processor to output, using a machine learning model, probabilities that neighboring pixels of pixels forming the rasterized trace are part of a lane based on the overhead representation and the rasterized trace. These probabilities may then be utilized to generate lane graphs.

In another embodiment, a method for unstructured lane estimation includes the steps of receiving, by a machine learning model, an overhead representation of a region and a rasterized trace generated from sensors of a vehicle traveling in the region and outputting, by the machine learning model, probabilities that neighboring pixels of pixels forming the rasterized trace are part of a lane based on the overhead representation and the rasterized trace. Like before, the probabilities may then be utilized to generate lane graphs.

In yet another embodiment, a non-transitory computer-readable medium includes instructions that, when executed by a processor, cause the processor to receive an overhead representation of a region and a rasterized trace generated from sensors of a vehicle traveling in the region and output, using a machine learning model, probabilities that neighboring pixels of pixels forming the rasterized trace is part of a lane based on the overhead representation and the rasterized trace. Again, the probabilities may then be utilized to generate lane graphs.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Described herein are systems and methods for generating data structures that may be multi-vector data structures that indicate the probability that a pixel is part of a lane. These data structures can then be utilized to generate lane graphs that can be utilized in semantic maps. In one example, an overhead representation of a region and rasterized traces generated from sensors of vehicles traveling in the region are provided to a trained machine learning model. The machine learning model outputs a data structure having multiple vectors, indicating that a particular pixel of the overhead representation is part of a lane. This data structure can then be utilized to generate lane graphs.

Figure 1:
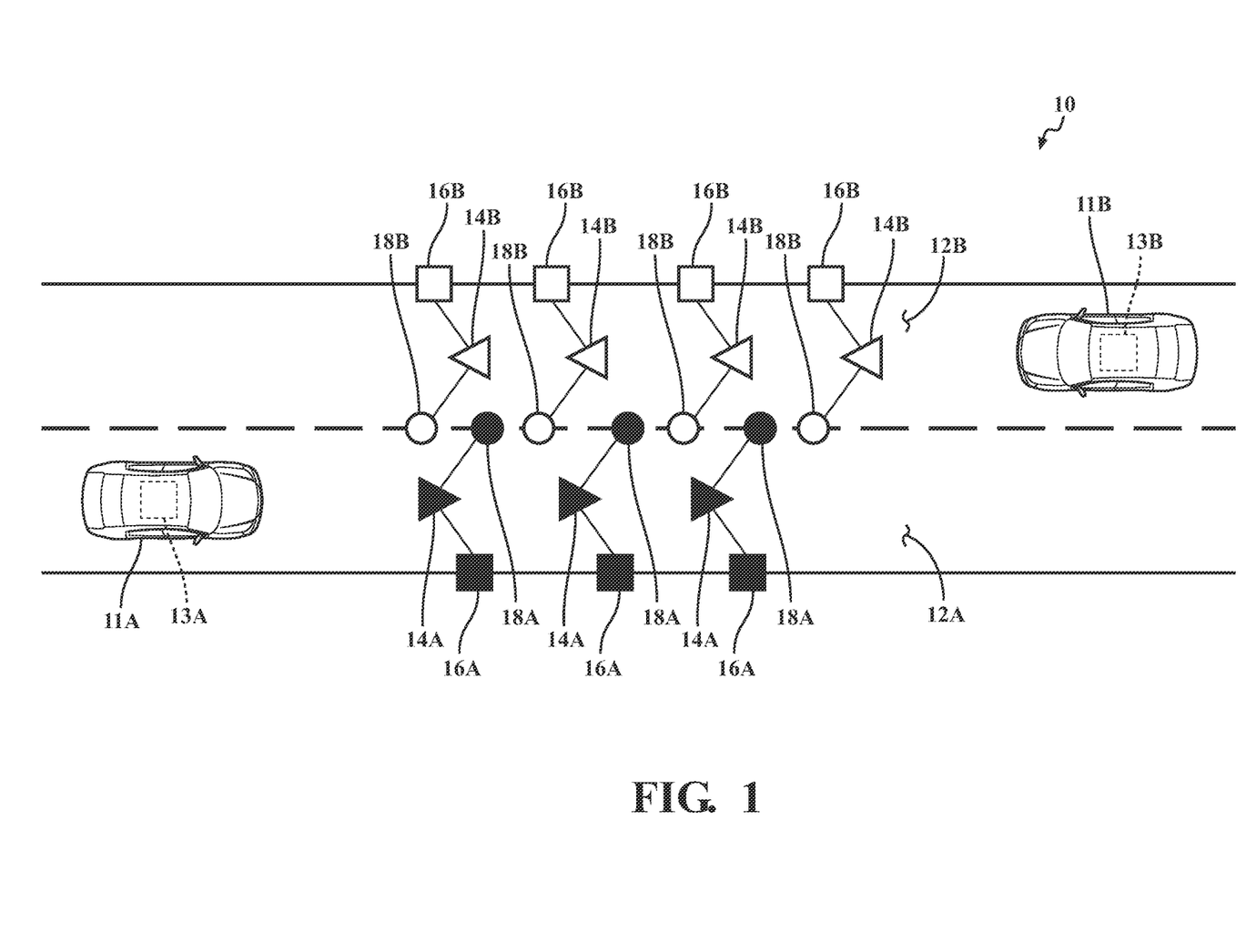
FIG. 1 illustrates an example of vehicles generating trace data.

Referring to FIG. 1, illustrated is a scene 10, including vehicles 11A and 11B traveling upon a roadway in opposite directions on lanes 12A and 12B, respectively. In this example, the vehicles 11A and 11B include sensor systems 13A and 13B, respectively, which are used to generate trace data. As such, the sensor systems 13A and/or 13B may include sensors such as Global Positioning Systems (GPS), inertial measurement unit (IMU), and accelerometers can include information about the location of the vehicle, known as trace points. Additionally, vehicle sensors that perceive an environment, such as cameras, LIDAR sensors, and radar sensors, can include information about the location, such as lane markings, known as key points. Key points include left key points, which identify lane markings and/or boundaries detected to the left of the vehicle sensor based on the direction of travel of the vehicle sensor(s). Key points also include right key points, which identify lane markings and/or boundaries detected to the right of the vehicle sensor based on the direction of travel of the vehicle sensor(s).

In this example, the sensor system 13A of the vehicle 11A generates trace data 14A, 16A, and 18A, while the sensor system 13B of the vehicle 11B generates trace data 14B, 16B, and 18B. Here, the trace data 14A and 14B may indicate the position of the vehicles 11A and 11B, respectively. The trace data 16A and 16B may include right key point data, such as lane markings to the right of the vehicles 11A and 11B, respectively, while the trace data 18A and 18B may include left key point data, such as lane markings to the left of the vehicles 11A and 11B, respectively.

The trace data that can be collected from vehicles, such as the vehicles 11A and 11B, can also include trace data from unstructured locations that may have drivable surfaces. Unstructured locations can include locations that typically lack structured roadways with defined lanes. As such, unstructured locations can include parking lots, undefined trails, driveways, etc. The mapping of unstructured locations with drivable surfaces is particularly difficult. However, as will be explained throughout this description, examples of the systems and methods described herein can generate data structures that can be utilized to create lane graphs based on vehicle trace data and overhead information.

Figure 2:
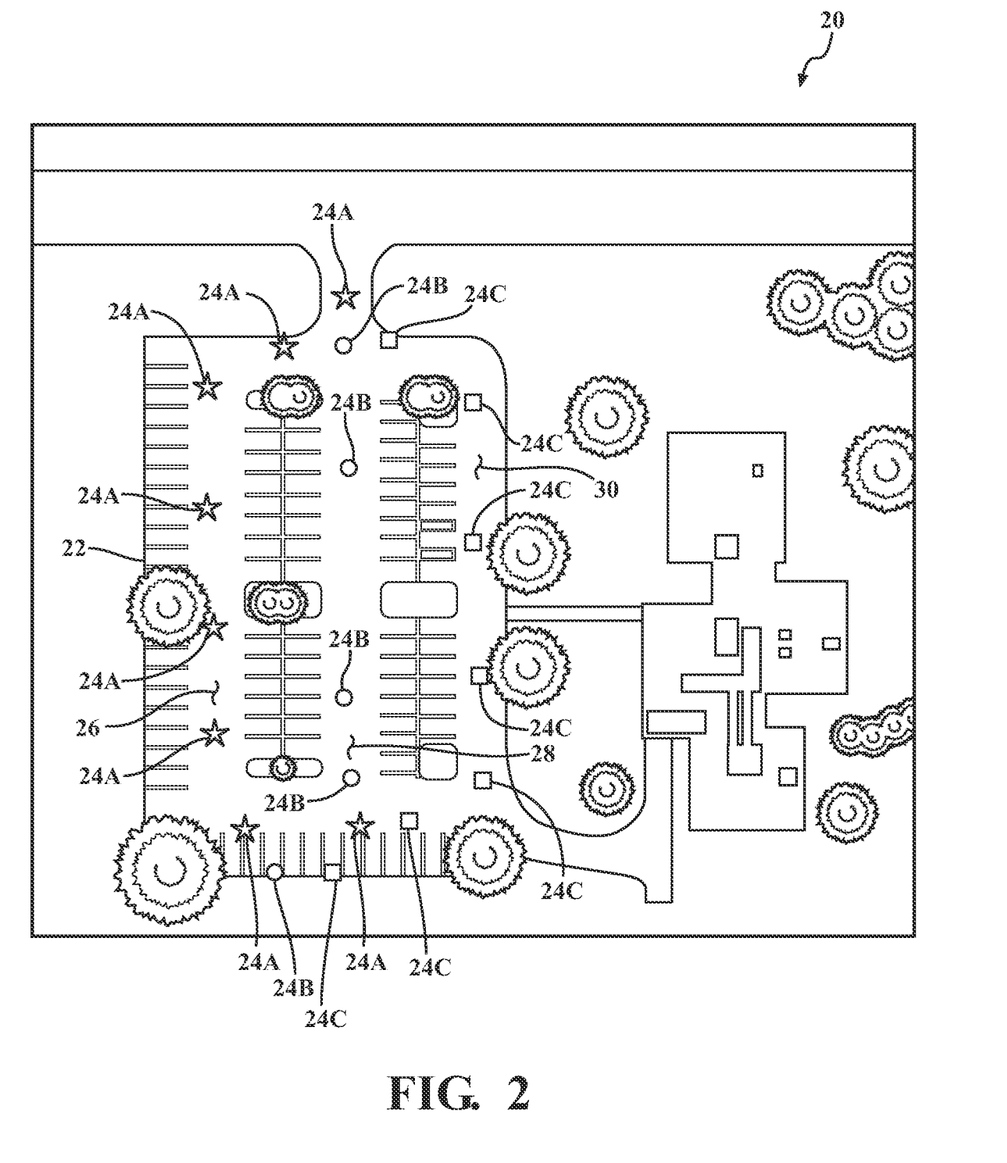
FIG. 2 illustrates trace data collected from multiple vehicles when traveling through a parking lot.

As mentioned before, unstructured locations can include parking lots. For example, FIG. 2 illustrates one example of an overhead representation data 20 of a parking lot 22, which generally includes three access lanes 26, 28, and 30 that provide access to multiple parking spaces. Also shown are multiple vehicle traces 24A, 24B, and 24C that may have been generated from multiple vehicles. In one example, a first vehicle may generate the vehicle traces 24A, a second vehicle may generate the vehicle traces 24B, and a third vehicle may generate the traces 24C. As explained previously, these traces may be generated by sensor systems located on the vehicles. They may include information such as vehicle location, trajectory, speed, heading, location, right key point, left key point, etc.

Figure 3:
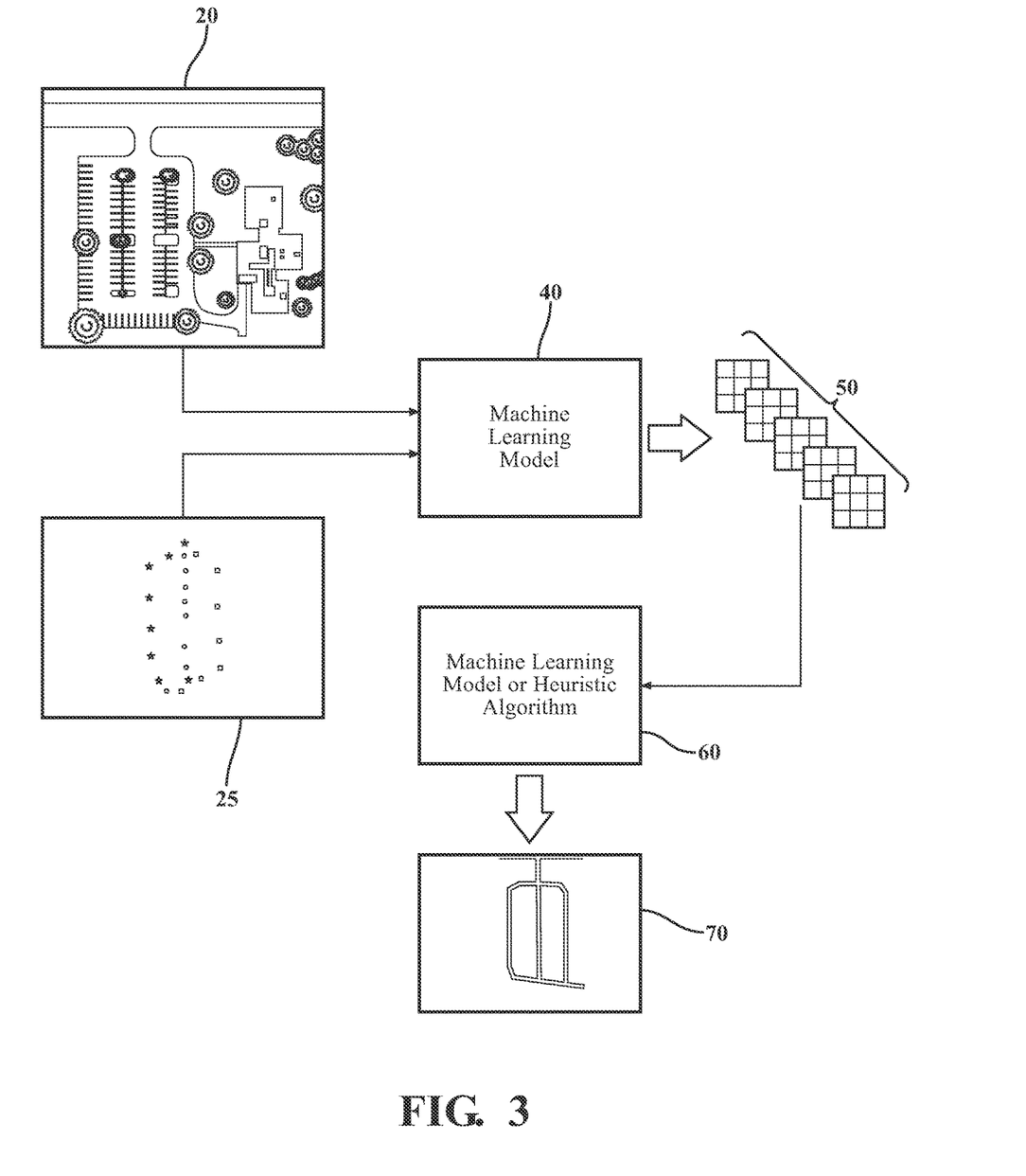
FIG. 3 illustrates a process flow using trace data and overhead information to generate lane graphs.

FIG. 3 illustrates one example regarding the construction of data structures that can be utilized to create lane graphs based on rasterized trace data 25 and an overhead representation data 20. The rasterized trace data 25 is a rasterized version of the vehicle trace data, such as trace data 24A-24C, that was previously discussed. Rasterization is the process of converting the vehicle trace data into a roster image.

The overhead representation data 20 may be an overhead view of the particular area, including vehicle trace data. The overhead representation may be a photograph or visual representation that may be generated from aerial photography, satellite imaging, a point cloud, a compilation of images captured by a camera mounted to the vehicle, and the like. In one example, the overhead representation may be an orthophoto which may be an aerial photograph or satellite imagery geometrically corrected (orthorectified) such that the scale is uniform, i.e., the photo or image follows a given map projection.

The overhead representation data 20 and the rasterized trace data 25 are then provided to a trained machine learning model 40, which may be a convolutional neural network (CNN) with fully connector layers. The machine learning model 40 outputs data structures 50, which will be described later in this description. Broadly, each of the data structures 50 may include vectors that indicate the likelihood that a pixel near the pixels forming the rasterized trace data 25 is part of a lane. The machine learning model 40 may be trained in a supervised fashion utilizing annotated ground truth data, such as annotated lane graph data.

The data structures 50 may then be provided to another machine learning model or a heuristic algorithm 60 where further processing can be performed to generate lane graphs 70 that represent lanes of the unstructured region representatives in the overhead representation data 20. The lane graph 70 may be a semantic map of the lane of a contextual environment and how the lane is connected to other lanes.

Figure 4A:
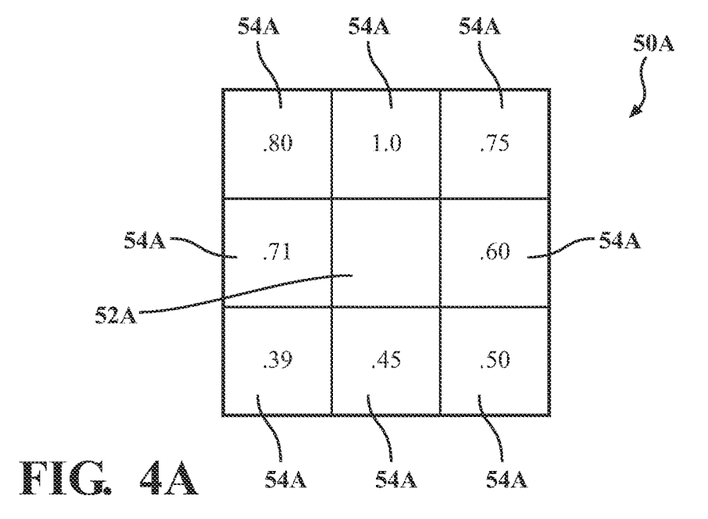
FIGS. 4A and 4B illustrate different examples of data structures containing vectors that indicate the probability that a particular pixel is part of a lane.
Figure 4B:
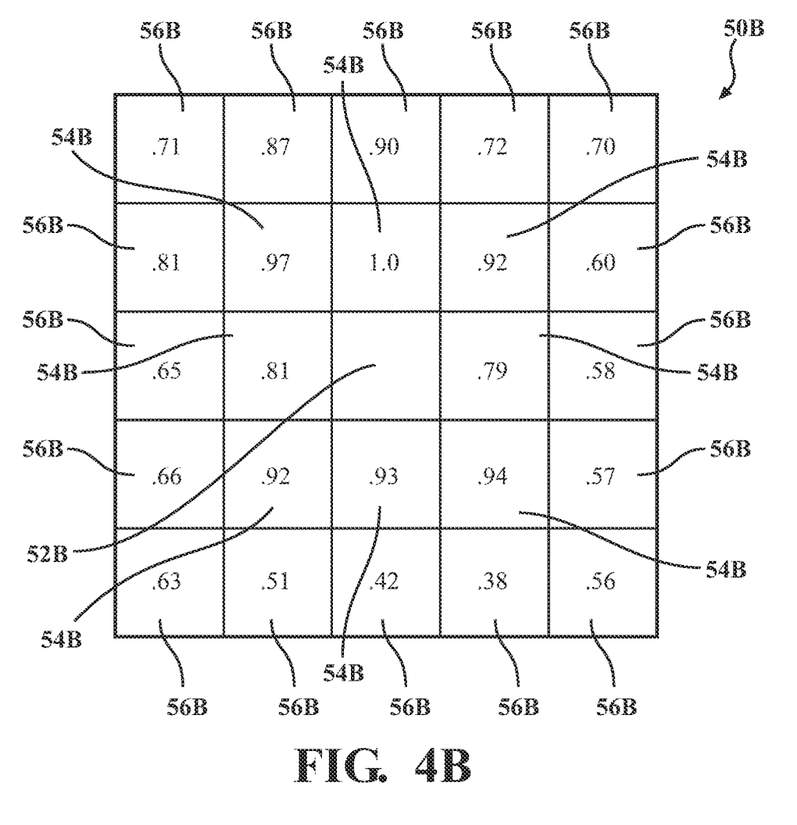

Referring to FIGS. 4A and 4B show different examples of data structures 50A and 50B, respectively, that may be output by the trained machine learning model 40. With particular attention to FIG. 4A, the data structure 50A is in an eight-vector data structure that includes vectors surrounding a pixel 52A, which is a pixel forming the rasterized trace data 25. The eight vectors 54A each have probabilities that pixels surrounding the pixel 52A form part of a road lane. The data structure 50B of FIG. 4B expands upon the data structure 50A and includes an inner set of eight vectors 54B, each having probabilities that pixels surrounding the pixel 52B form part of a road lane, and an outer set 56B, each having probabilities that these pixels form part of a road lane. As such, the data structure 50B is a 24-vector data structure. It should be noted that the data structures 50A and 50B are merely examples of data structures. The number of vectors utilized can vary considerably, as well as their placement around a pixel of a rasterized trace.

Figure 5:
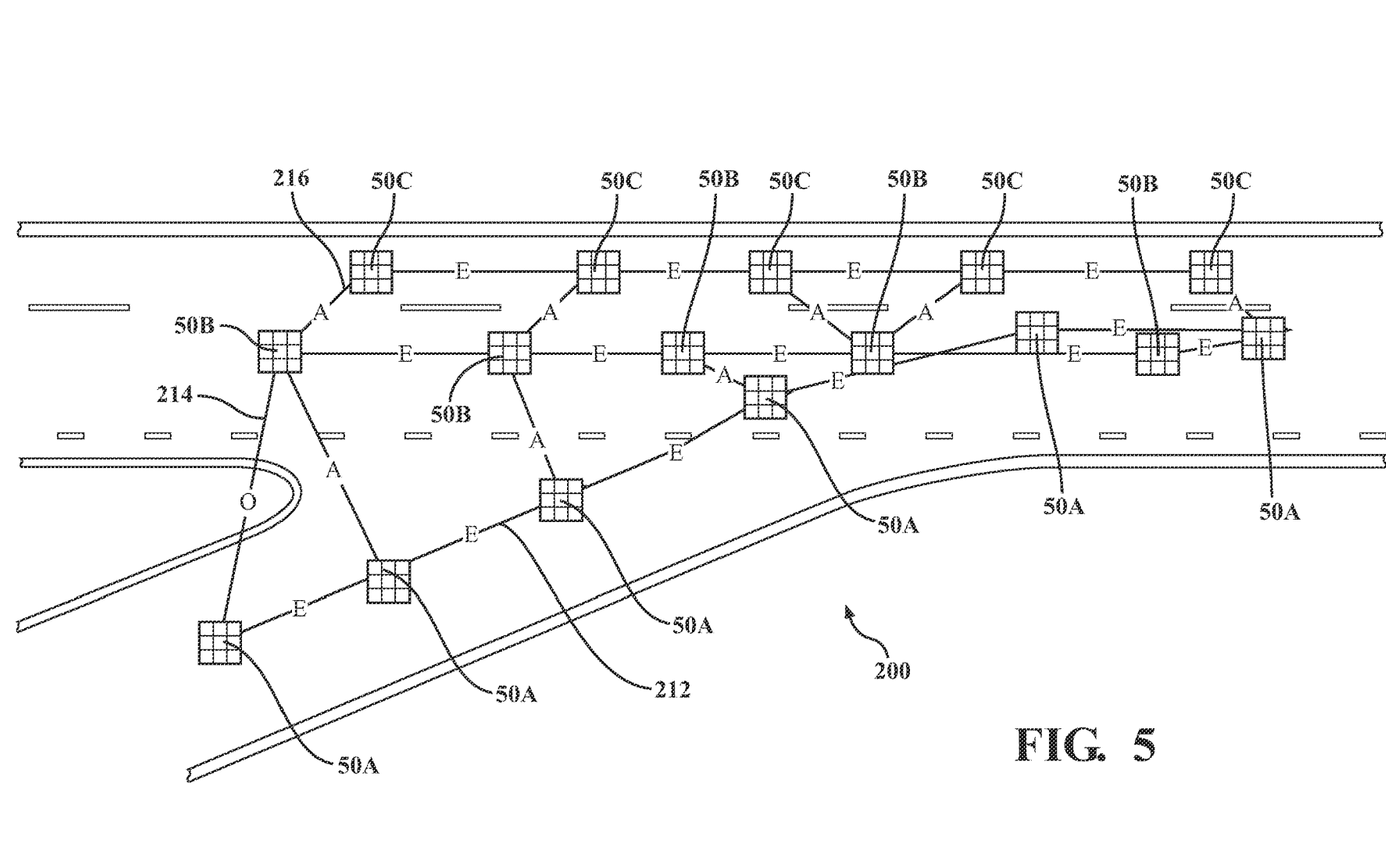
FIG. 5 illustrates one example of utilizing multiple eight-vector data structures to generate lane graphs.

Generating the lane graphs 70 can be performed in any one of several different ways and should not be limited to just those methodologies described in this description. For example, FIG. 5 illustrates a road portion 200 that includes data structures 50A, 50B, and 50C that may have been generated by three different vehicles. As mentioned previously, the data structures are generated by a trained machine learning model that utilizes both rasterized trace data 25 and an overhead representation data 20 to generate the data structures 50A, 50B, and 50C. The machine learning model or the heuristic algorithm 60 may be able to infer connections between the different data structures 50A, 50B, and 50C. For example, the machine learning model or the heuristic algorithm 60 can solve the relationship between data structures 50A, 50B, and 50C by selecting the highest probability value from the three probability values—ego, adjacent, and other, and inferring connecting lines based on the relationship associated with the highest probability value. As yet another example, the machine learning model or the heuristic algorithm 60 can solve the relationship between the data structures 50A, 50B, and 50C by selecting the highest probability value from the three probability values—ego, adjacent, and other, and inferring connecting lines based on the relationship associated with the highest probability value. The connecting lines 212, 214, and 216 can be marked as E (for ego), A (for adjacent), or O (for other), as shown in FIG. 5.

For example, the machine learning model or the heuristic algorithm 60 computes centerlines for all lanes by retaining a certain trajectory and/or averaging all trajectories within a lane. In a case where no trajectory covers the entire length of a lane, the map generating system may use averaging or any suitable technique that utilizes multiple trajectories and infers the boundaries of the lanes to generate lane graphs 70. Again, it should be understood this is but one way to generate lane graphs 70 utilizing the data structures 50A, 50B, and 50C described herein. Any one of a number of different methodologies can be utilized to generate lane graphs 70 utilizing the data structures 50A, 50B, and 50C.

As mentioned before, other methodologies can also be used to generate the lane graphs 70. In another example, a tessellation could be applied to the scene 200 and iterated over the resulting pixels by the machine learning model or a heuristic algorithm 60. In each iteration, the machine learning model or a heuristic algorithm 60 could estimate for each of the neighboring pixels 54A of data structures 50A the probability of a particular pixel being part of the ego lane, the right lane, left lane, or no lane at all. For each neighborhood of two pixels in 200, the machine learning model or a heuristic algorithm 60 would then select the relationship among ego, left, right, and others to yield the best consistent pixel graph, with "best" meaning that the total probability of the pixel graph is maximized. On an arbitrary round trip through a consistent pixel graph, the sum of all edges you travel along would always be ego. The machine learning model or a heuristic algorithm 60 would then skeletonize the pixel graph to obtain the lane graph 70.

Figure 6:
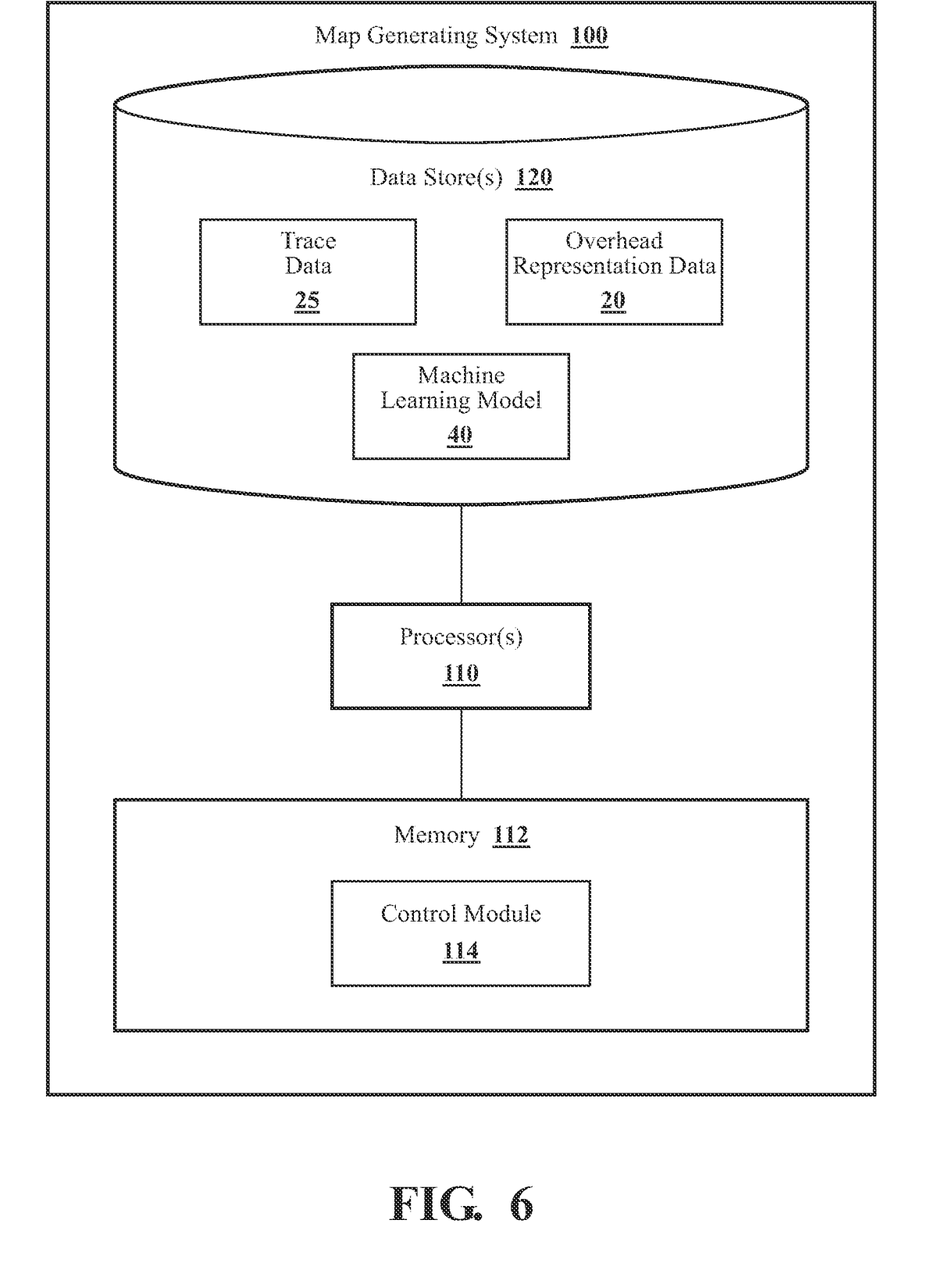
FIG. 6 illustrates one example of a map-generating system that can generate data structures that indicate probabilities that nearby pixels form part of a lane and/or lane graphs based on the data structures that indicate probabilities that nearby pixels form part of a lane.

FIG. 6 shows one embodiment of a map generating system 100 that may perform any of the methodologies described herein. The mapping system 100 includes one or more processor(s) 110. Accordingly, the processor(s) 110 may be a part of the map generating system 100, or the map generating system 100 may access the processor(s) 110 through a data bus or another communication path. In one or more embodiments, the processor(s) 110 is an application-specific integrated circuit (ASIC) that is configured to implement functions associated with a control module 114. In general, the processor(s) 110 is an electronic processor, such as a microprocessor, capable of performing various functions described herein.

In one embodiment, the map generating system 100 includes a memory 112 that stores the control module 114 and/or other modules that may support generating road mapping. The memory 112 may be a random-access memory (RAM), read-only memory (ROM), a hard disk drive, a flash memory, or another suitable memory for storing the control module 114. The control module 114 is, for example, machine-readable instructions that, when executed by the processor(s) 110, cause the processor(s) 110 to perform the various functions disclosed herein. In further arrangements, the control module 114 is a logic, integrated circuit, or another device for performing the noted functions that include the instructions integrated therein.

Furthermore, in one embodiment, the map generating system 100 includes a data store 120. The data store 120 is, in one arrangement, an electronic data structure stored in the memory 112 or another data store, and that is configured with routines that can be executed by the processor(s) 110 for analyzing stored data, providing stored data, organizing stored data, and so on. Thus, in one embodiment, the data store 120 stores data used by the control module 114 in executing various functions.

In one example, the data store 120 may store rasterized trace data 25, which may be the vehicle trace data 24 generated from vehicle sensors. As explained earlier, the vehicle trace data 24 is data generated from one or more vehicle sensors that may include vehicle position, trajectory, speed, left key points, right key points, etc. The rasterized trace data 25 has essentially rasterized the vehicle trace data 24 to be processed. It should also be understood that the data store 120 may also store the raw vehicle trace data 24 and the rasterized trace data 25.

Additionally, the data store 120 may also include the overhead data 20. As explained previously, the overhead data 20 includes overhead views of a region that includes the rasterized trace data 25. Moreover, the region may have been traversed by one or more vehicles that generated the vehicle trace data 24 that was later rasterized to generate the rasterized trace data 25. The overhead data 20 can be any type of overhead data, such as aerial photography (aerial view), satellite imaging (satellite view), a point cloud, a compilation of images captured by a camera mounted to the vehicle, and the like. In one example, the overhead data 20 may be an orthophoto of the region.

The data store 120 may also include the machine learning model 40 that generates the data structures 50 previously described herein. As mentioned earlier, the machine learning model 40 may be a trained machine learning model that was trained using annotated data in a supervised fashion. The machine learning model 40 may be a CNN with fully connected layers ted layers. While not shown, the data store 120 may also include other machine learning models are discrete algorithms that may be utilized to generate lane graphs and/or semantic maps, such as the machine learning model or heuristic algorithm 60 of FIG. 3.

The control module 114 includes instructions that, when executed by the processor(s) 110, cause the processor(s) 110 to perform any of the functions described herein. In one example, the control module 114 includes instructions that cause the processor(s) 110 to receive the overhead data 20 and the rasterized trace data 25. From there, the control module 114 includes instructions that cause the processor(s) 110 to generate the data structures 50 that indicate probabilities that neighboring pixels of pixels forming the rasterized trace data 25 is part of a lane based on the overhead representation data 20 and the rasterized trace data 25. The control module 114 may further include instructions that cause the processor(s) 110 to generate the lane graph 70 using the probabilities that neighboring pixels of pixels forming the rasterized trace data 25 are part of a lane. The lane graph 70 is a semantic map of the lane of a contextual environment and how the lane is connected to other lanes.

Figure 7:
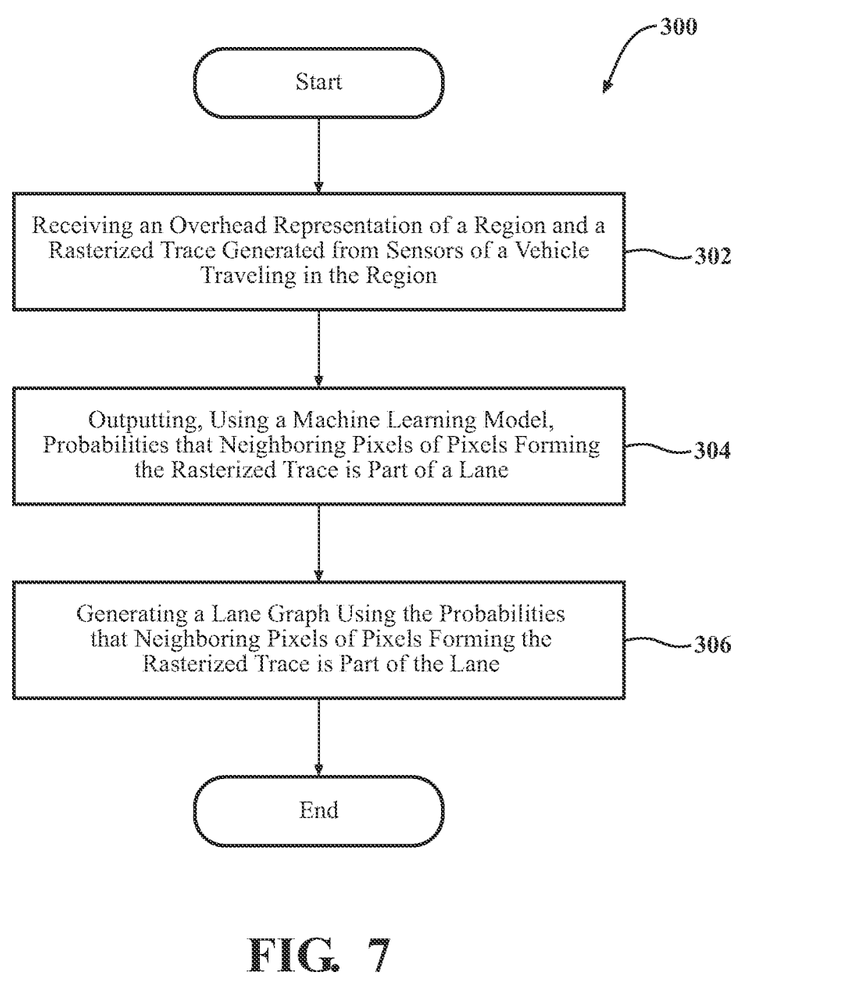
FIG. 7 illustrates one example of a method for generating data structures that indicate probabilities that nearby pixels form part of a lane and/or lane graphs based on the data structures that indicate probabilities that nearby pixels form part of a lane.

Referring to FIG. 7, a method 300 generating mapping information is shown. The method 300 will be described from the viewpoint of the mapping system 100 of FIG. 6 and the process flow of FIG. 3. However, it should be understood that this is just one example of implementing the method 300. While method 300 is discussed in combination with the mapping system 100, it should be appreciated that the method 300 is not limited to being implemented within the mapping system 100, but is instead one example of a system that may implement the method 300.

In step 302, instructions within the control module 114 cause the processor(s) 110 to receive an overhead representation data 20 of a region and one or more rasterized traces 25 generated from sensors of a vehicle that traveled through the region. The rasterized traces 25 may be created by processing sensor information collected by the vehicle during or after traveling through the region. The overhead representation data 20, as explained before, can be any type of overhead representation of the region, such as aerial photography, satellite imaging, a point cloud, a compilation of images captured by a camera mounted to the vehicle, and the like. In one example, the overhead representation data 20 may be an orthophoto of the region.

In step 304, instructions within the control module 114 cause the processor(s) 110 to output, using a machine learning model 40, probabilities that neighboring pixels of pixels forming the rasterized trace data 25 is part of the lane. The probabilities may be in the form of data structures 50 previously described and may include a plurality of vectors, such as eight vectors (described in FIG. 4A) or 24 vectors (described in FIG. 4B).

In step 306, instructions within the control module 114 cause the processor(s) 110 to generate a lane graph 70 using the probabilities that neighboring pixels of pixels forming the rasterized trace data 25 are part of a particular lane. Any one of a number of different methodologies can be utilized to generate the lane graphs based on the probabilities. In one example, the processor(s) 110 infer connections between different data structures. For example, the processor(s) 110 may solve the relationship between data structures by selecting the highest probability value from the three probability values—ego, adjacent, and other, and inferring connecting lines based on the relationship associated with the highest probability value. The processor(s) 110 may then determine the most probable relationship based on the highest of the first, second, and third values. The system groups trace points into lanes based on the determined relationships and then groups the key points based on the determined lanes.

Using the systems and methods described herein, lane graphs can be generated to perform lane estimation in uninstructed but drivable areas, such as parking lots, trails, or other unstructured areas. The systems and methods described herein improve the overall efficiency and reduce the tediousness in performing lane estimation in unstructured areas.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code comprising one or more executable instructions for implementing the specified logical function(s). It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any processing system or apparatus adapted for the methods described herein is suited. A typical combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and which, when loaded in a processing system, can carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. For example, "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system comprising:
   a processor; and
   a memory in communication with the processor, the memory having instructions that, when executed by the processor, cause the processor to:
      during an inference mode, output, using a machine learning model that receives as inputs an overhead representation of a region and a rasterized trace generated from sensors of a vehicle traveling in the region, probabilities that neighboring pixels of pixels forming the rasterized trace is part of a lane based on the overhead representation and the rasterized trace.

2. The system of claim 1, wherein the memory further includes instructions that, when executed by the processor, cause the processor to generate a lane graph using the probabilities that neighboring pixels of pixels forming the rasterized trace are part of the lane, the lane graph being a semantic map of the lane of a contextual environment and how the lane is connected to other lanes.

3. The system of claim 1, wherein the probabilities are an eight-vector data structure indicating probabilities that neighboring pixels surrounding one of the pixels forming the rasterized trace is part of the lane.

4. The system of claim 1, wherein the rasterized trace includes trajectories of the vehicle.

5. The system of claim 1, wherein the overhead representation includes one or more of: an orthophoto, an aerial view, a satellite view, a point cloud, and a compilation of images captured by a camera mounted to the vehicle.

6. The system of claim 1, wherein the machine learning model is a convolutional neural network with fully connected layers.

7. The system of claim 1, wherein the lane is in an unstructured location and is not defined by lane markings.

8. A method comprising:
   during an inference mode, outputting, by a machine learning model that receives as inputs an overhead representation of a region and a rasterized trace generated from sensors of a vehicle traveling in the region, probabilities that neighboring pixels of pixels forming the rasterized trace are part of a lane based on the overhead representation and the rasterized trace.

9. The method of claim 8, further comprising generating a lane graph using the probabilities that neighboring pixels of pixels forming the rasterized trace are part of the lane, the lane graph being a semantic map of the lane of a contextual environment and how the lane is connected to other lanes.

10. The method of claim 8, wherein the probabilities are an eight-vector data structure indicating probabilities that neighboring pixels surrounding one of the pixels forming the rasterized trace is part of the lane.

11. The method of claim 8, wherein the rasterized trace includes trajectories of the vehicle.

12. The method of claim 8, wherein the overhead representation includes one or more of: an orthophoto, an aerial view, a satellite view, a point cloud, a compilation of images captured by a camera mounted to the vehicle.

13. The method of claim 8, wherein the machine learning model is a convolutional neural network with fully connected layers.

14. The method of claim 8, wherein the lane is in an unstructured location and is not defined by lane markings.

15. A non-transitory computer-readable medium having instructions that, when executed by a processor, causes the processor to:
   during an inference mode, output, using a machine learning model that receives as inputs an overhead representation of a region and a rasterized trace generated from sensors of a vehicle traveling in the region, probabilities that neighboring pixels of pixels forming the rasterized trace is part of a lane based on the overhead representation and the rasterized trace.

16. The non-transitory computer-readable medium of claim 15, wherein the non-transitory computer-readable medium further includes instructions that, when executed by the processor, cause the processor to generate a lane graph using the probabilities that neighboring pixels of pixels forming the rasterized trace are part of the lane, the lane graph being a semantic map of the lane of a contextual environment and how the lane is connected to other lanes.

17. The non-transitory computer-readable medium of claim 15, wherein the probabilities are an eight-vector data structure indicating probabilities that neighboring pixels surrounding one of the pixels forming the rasterized trace is part of the lane.

18. The non-transitory computer-readable medium of claim 15, wherein the rasterized trace includes trajectories of the vehicle.

19. The non-transitory computer-readable medium of claim 15, wherein the overhead representation includes one or more of: an orthophoto, an aerial view, a satellite view, a point cloud, a compilation of images captured by a camera mounted to the vehicle.

20. The non-transitory computer-readable medium of claim 15, wherein the lane is in an unstructured location and is not defined by lane markings.

* * * * *